United States Patent Office 3,002,021
Patented Sept. 26, 1961

3,002,021
NEW DERIVATIVES OF THE TETRACYCLINE-
TYPE ANTIBIOTICS
Hans H. Rennhard, Lyme, Lloyd H. Conover, Quaker Hill, Philip N. Gordon, Old Lyme, and Charles R. Stephens, Jr., Niantic, Conn., assignors to Chas. Pfizer & Co., Inc., New York, N.Y., a corporation of Delaware
No Drawing. Filed May 18, 1959, Ser. No. 813,654
3 Claims. (Cl. 260—559)

This invention is concerned with a process for the preparation of certain novel organic compounds and with the new compounds thus prepared. In particular, it is concerned with the preparation of certain derivatives of tetracycline-type antibiotics and the acid addition salts thereof.

The term "tetracycline-type antibiotics" is taken to include tetracycline, 5-hydroxytetracycline, 7-chlortetracycline, 7-bromotetracycline, all of which possess a highly substituted perhydronaphthacene ring system, and certain derivatives of these compounds, such as, their 4-desdimethylamino derivatives, 6-demethyltetracycline, 6-deoxytetracycline, 4-epi-tetracycline, 6-deoxy-6-demethyltetracycline, 6-demethyl-7-chlortetracycline, and 5-hydroxy-6-deoxytetracycline. Also included are the acid addition salts thereof with mineral acids, such as, hydrochloric, sulfuric and phosphoric acids, and with strong organic acids, such as, paratoluene sulfonic acid.

The compounds of the present invention may be represented by the following formula although other enolic tautomers are possible:

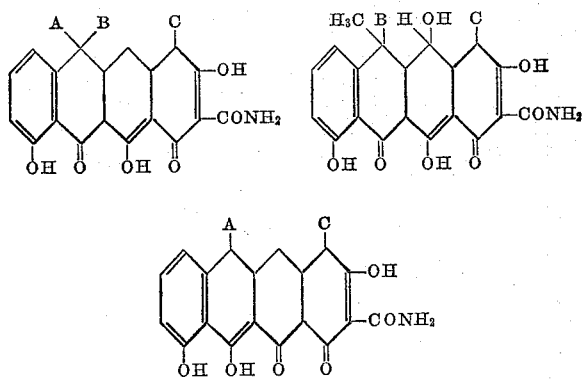

the pharmaceutically acceptable acid addition salts thereof wherein; A is selected from the group consisting of hydrogen and methyl; B is selected from the group consisting of hydrogen and hydroxyl; and C is selected from the group consisting of hydrogen and dimethylamino.

These novel substances have molecular formulas which differ from those of the parent tetracycline-type antibiotics from which they are derived by an oxygen atom; said oxygen atom being removed from the 12a-position to give 12a-deoxy tetracycline-type antibiotics. From a structural standpoint, replacement of the 12a-hydroxyl group by hydrogen is accompanied by a change in the direction of enolization in the B ring of the tetracycline-type antibiotics.

The compounds of this invention have unique pharmaceutical and physiological properties which distinguish them from the parent antibiotics and related derivatives thereof. Their antibiotic spectra differ from those of the parent compounds.

The pure 12a-deoxy compounds possess activity against a variety of gram-positive and gram-negative microorganisms and, in addition, are effective against tetracycline-resistant strains of bacteria. By virtue of this lack of cross-resistance they represent a significant contribution to the pharmaceutical industry and the public welfare. They appear to be rapidly and completely absorbed from the gastrointestinal tract. The present substances in the pure free base form are very insoluble in water and in most of the common organic solvents which particularly adapts them for use in the preparation of pharmaceutical suspensions, topical preparations, such as dusting powders and ointments, and for repository parenteral forms for intramuscular use. They provide aqueous suspensions which have improved stability and a bland taste, and, since they possess activity similar to the parent tetracycline compounds, are used in dosage forms and compositions of similar concentration. They appear to be far more resistant to epimerization than are the parent antibiotics from which they are derived, and those containing a 6-hydroxyl group are particularly susceptible to dehydration at the 5a,6-positions on treatment with a strong acid.

The process of the present invention may be carried out in general by catalytic hydrogenation, in a substantially anhydrous reaction-inert solvent, of a 12a-(O-acyl) derivative of the desired tetracycline-type antibiotic wherein the acyl radical is that of a hydrocarbon carboxylic acid containing from one to six carbon atoms, inclusive or of the 12a-(O-arylcarbamyl) derivative of the appropriate tetracycline-type antibiotic wherein the arylcarbamyl radical is selected from the group consisting of

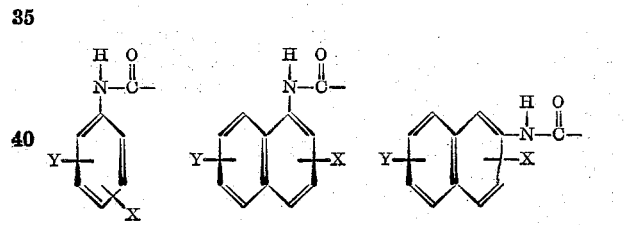

wherein X and Y are selected from the group consisting of hydrogen, halogen, nitro, amino, lower alkyl and lower alkoxy. Suitable 12a-(O-acylated)-tetracycline-type antibiotics which may serve as starting materials for the process of this invention to produce the novel 12a-deoxy compounds within the purview of this invention are listed below:

12a-(O-monoformyl)-tetracycline
12a-(O-monoformyl)-6-demethyltetracycline
12a-(O-monoformyl)-6-deoxytetracycline
12a-(O-monoformyl)-6-deoxy-6-demethyltetracycline
12a-(O-monoformyl)-6-demethyl-7-chlortetracycline
12a-(O-monoformyl)-7-bromotetracycline
12a-(O-monoformyl)-7-chlorotetracycline
12a-(O-monoacetyl)-5-hydroxytetracycline
12a-(O-monopropionyl)-5-hydroxytetracycline
12a-(O-monoacetyl)-7-chlortetracycline
12a-(O-monoacetyl)-tetracycline
12a-(O-monobutyryl)-7-chlortetracycline
12a-(O-monobutyryl)-tetracycline
12a-(O-mono-n-caproyl)-tetracycline
12a-(O-monobutyryl)-5-hydroxy-tetracycline
12a-(O-monovaleryl)-tetracycline 12a-(O-arylcarbamyl) derivatives suitable as reactants in the process of this invention are:

12a-(O-phenylcarbamyl)-tetracycline
12a-(O-phenylcarbamyl)-6-demethyltetracycline
12a-(O-phenylcarbamyl)-6-deoxytetracycline
12a-(O-phenylcarbamyl)-7-chlorotetracycline
12a - (O - phenylcarbamyl) - 4 - desdimethylaminotetracycline
12a-(O-phenylcarbamyl)-5-hydroxytetracycline
12a-(O-2,5-dichlorophenylcarbamyl)-tetracycline
12a - (O - p - methoxyphenylcarbamyl) - 5 - hydroxytetracycline
12a - (O - p - iodophenylcarbamyl) - 6 - deoxy - 5 - hydroxytetracycline
12a-(O-p-methoxyphenylcarbamyl)-tetracycline
12a - (O - o - xylylcarbamyl) - 6 - demethyl - 7 - chlortetracycline
12a-(O-p-butylphenylcarbamyl)-6-deoxytetracycline
12a-(O-2,4-dichlorophenylcarbamyl)-tetracycline
12a-(O-2-nitro-4-tolylcarbamyl)-tetracycline
12a-(O-o-chlorophenylcarbamyl)-tetracycline
12a-(O-o-methoxyphenylcarbamyl)-tetracycline
12a-(O-p-bromophenylcarbamyl)-tetracycline
12a-(O-p-ethoxyphenylcarbamyl)-tetracycline
12a-(O-p-nitrophenylcarbamyl)-tetracycline
12a-(O-naphthylcarbamyl)-tetracycline
12a(O-2-naphthylcarbamyl)-5-hydroxytetracycline
12a - (O - 2 - methyl - 1 - naphthylcarbamyl) - 5 - hydroxytetracycline
12a-(O-1-naphthylcarbamyl)-7-chlortetracycline
12a - (O - 2,5 - dichloro - 1 - naphthylcarbamyl) - tetracycline
12a - (O - 3,4 - dimethyl - 1 - naphthylcarbamyl) - 6 - demethyltetracycline
12a - (O - p - nitrophenylcarbamyl) - 4 - desdimethylamino-tetracycline
12a - (O - p - nitrophenylcarbamyl) - 4 - desdimethylamino-5-hydroxy-tetracycline
12a-(O-p-fluorophenylcarbamyl)-6-deoxytetracycline
12a-(O-p-aminophenylcarbamyl)-5-hydroxytetracycline
12a - (O - p - aminophenylcarbamyl) - 4 - desdimethylamino-5-hydroxytetracycline The 12a-(O-monoformyl) derivatives utilized as reactants in the present process are prepared from the tetracycline-type antibiotics by treatment with from 1 to 25 molecular proportions of acetoformic acid at a temperature of from −30° C. to +50° C. as described in the copending patent application filed on December 23, 1958, by Stephens and Blackwood, Serial No. 782,407. The phenylcarbamyl derivatives utilized as reactants are prepared from the tetracycline-type antibiotics by reaction with the appropriate aryl isocyanate under anhydrous conditions in an inert solvent as described in the copending and concurrently filed patent application of Blackwood, Serial No. 813,653 filed on May 18, 1959. The 12a-(O-monoesters) other than the 12a-(O-monoformyl) derivatives are prepared as described by Gordon, U.S. 2,812,349, November 5, 1957.

Suitably a tetracycline-type antibiotic having acyl groups in other positions of the molecule in addition to the 12a-position can also be used in the process of this invention. Thus, 10,12a - (O - diacyl) - 5 - hydroxytetracycline, 5,12a-(O-diacyl)-5-hydroxytetracycline, 12, 12a - (O - diacyl) - 4 - epi - tetracycline, 12a12a - (O-diacyl)-tetracycline, and diformyl-5-hydroxytetracycline undergo hydrogenolysis with removal of the 12a-acyloxy group to produce the corresponding 12a-deoxy derivative of the acylated tetracycline type antibiotic. Hydrogenolysis of a polyacylate derivative, wherein for example, the 6 and 12a-hydroxy groups are acylated, by the process of this invention results in simultaneous replacement of both ester groups by hydrogen with formation of a dideoxy derivative. The remaining acyl groups can be removed by hydrolysis with, for example, an alkaline reacting material such as, ammonium hydroxide, sodium carbonate, sodium hydroxide or the corresponding potassium salts. Acid hydrolyzing agents, are operative in certain cases. They are recommended only with 6-deoxy compounds in view of undesirable side reactions, such as, dehydration, which may occur when a hydroxyl group is present at the 6-position. Of the many hydrolyzing agents available, ammonium hydroxide is preferred since it permits the use of mild reaction conditions and avoids side reactions.

The 10,12a-(O-diacyl)-derivatives are obtained as described in the copending and concurrently filed patent application Serial No. 813,652. The 12, 12a-(O-diacyl), the 5,12a-(O-diacyl) derivatives utilized as starting materials are prepared according to the procedure of Gordon described in the copending application filed on July 2, 1957 Serial No. 669,442, and now abandoned.

The 12a-(O-monoformyl) and 12a-(O-arylcarbamyl) derivatives undergo hydrogenolysis under mild conditions of temperature and pressure; that is, at temperatures from about 45° C. to 100° C. and pressures from about atmospheric to about 150 p.s.i. The remaining 12a-(O-acyl)-derivatives require conditions of higher pressures to effect reduction.

The presence of an acyl group at the C-10 hydroxy group, in addition to the C-12a hydroxy group, appears to activate hydrogenolysis to the 12a-deoxy compound whereas an acyl group in certain other positions appears to retard reaction. Thus, the 10, 12a-(O-diacetyl) derivative of 5-hydroxytetracycline undergoes hydrogenolysis with conversion to the 12a-deoxy derivative of 10-(O-monoacetyl)-5-hydroxytetracycline under mild conditions of temperature and pressure. The 5,12a-(O-diacetyl) derivative of 5-hydroxytetracycline, on the other hand, requires relatively high pressures and elevated temperatures in order to effect removal of the 12a-acyloxy group.

12a-(O-acyl) and arylcarbamyl derivatives of 7-bromotetracyclines and 7-chlortetracyclines, when subjected to the process of the present invention, undergo a two step hydrogenolysis to produce 12a-deoxytetracyclines.

In carrying out the process of the present invention, the 12a-(O-monoformyl) or 12a-(O-arylcarbamyl) derivative of a tetracycline-type antibiotic, is dissolved in a suitable substantially anhydrous reaction-inert solvent and hydrogenated in the presence of a suitable hydrogenation catalyst. As suitable solvents there may be mentioned dioxane, tetrahydrofuran, ethyl acetate, dimethylformamide, pyridine, phenetole, dialkyl ethers, Cellosolve acetate, and other aprotic solvents. Tetrahydrofuran, ether and dioxane represent preferred solvent systems. Solvents which contain hydroxyl groups, such as alcohols, are detrimental to the process of this invention since they may cause hydrolysis of the 12a-formyl group. However, with other 12a-acyl or arylcarbamyl derivatives, alcohols are operative as solvents. Solvents such as aldehydes and ketones, which are unstable to hydrogenation, are to be avoided. The solvent used need not be completely anhydrous. Traces of water, such as are found in the commercially available grades of solvents suitable for this process do not interfere with the reaction.

The choice of hydrogenation catalyst is not critical. The noble-metal hydrogenation catalysts, such as palladinized-charcoal, platinum black, and platinum oxide can be used. Palladinized charcoal is the preferred catalyst in view of its availability, the relatively mild reaction conditions which it requires, and the overall yields realized. In general, from about 1% to about 10% of palladium, based upon the weight of tetracycline-type antibiotic present, is used in the form of palladinized charcoal (5%). Smaller or larger quantities of catalyst can be employed; however, the range cited above is satisfactory from the standpoint of yields and economics.

The temperature, pressure and time of the reaction are inter-related to the extent that a high temperature permits utilization of a relatively low pressure and relatively short reaction times; whereas a low temperature requires a relatively high pressure and generally relatively longer reaction periods.

In general, a temperature of from about 45° C. to about 100° C. can be used. Lower and higher temperatures are operable but not desirable because of poor yields resulting from insufficient reaction or decomposition.

A pressure of from about atmospheric to about 2000 p.s.i can be used over the temperature range given above. Lower and higher pressures are operable but, because of low yields of desired products, or the need for specialized apparatus, are not desirable.

A reaction period of from about ¼ hour to about 25 hours, depending upon the temperature and pressure chosen, is generally adequate to produce maximum yields.

In general, it is preferred to use the 12a-(O-monoformyl)-, 12a-(O-arylcarbamyl)- and 10,12a-(O-diacyl)- derivatives of the tetracycline-type antibiotics as reactants for preparing the 12a-deoxy compounds of this invention because of the relatively mild reduction conditions required. The reaction is advantageously conducted in tetrahydrofuran using from about 1% to 5% palladium on charcoal (5%) by weight of tetracycline-type antibiotic as hydrogenation catalyst at a temperature of from about 45° C. to 85° C. and a hydrogen pressure of from about 40 p.s.i to 100 p.s.i for a period of about 8 hours to 20 hours. At the end of the reaction period, the hydrogen pressure is released, the vessel flushed with nitrogen and the contents removed. The catalyst is removed by filtration and washed with solvent. An equal volume of methanol is added to the combined filtrate and washings and the mixture concentrated under reduced pressure. The product is removed by filtration, washed with methanol and dried in vacuo at about 75° C.

When using the 5,12a-(O-diacetyl)-, the 12a-(O-monoacetyl) and the diformyl derivatives of 5-hydroxytetracycline as starting materials, pressures up to 2000 p.s.i. and temperatures up to 100° C. may be required to bring about hydrogenolysis. Side reactions may occur in some cases. The products thus obtained which still contain an acyl group can be hydrolyzed directly to the 12a-deoxy-non-acylated derivatives and then isolated in the manner described. Alternatively, the 12a-deoxy-acyl derivative can be separated as such by evaporation of the solvent or by precipitation with, for example, a non-solvent, such as hexane, and then subjected to hydrolysis whereby the remaining acyl group is removed.

The 12a-deoxy tetracycline-type antibiotics of this invention are often yellow to orange-red in color and are often difficulty soluble in methanol, ethanol, water, slightly soluble in tetrahydrofuran and soluble in pyridine and dimethylformamide. In the case of 12a-deoxytetracycline, the product is obtained from methanol as orange-red crystals containing one mole of solvated methanol which is not removed on heating up to 65° C. and at pressures as low as 0.1 mm. It appears to exist in two tautomeric forms; one stable and one unstable, which are not separable by ordinary methods. The presence of an unstable form is suggested by the relatively rapid change in the ultraviolet spectrum of a freshly prepared solution on standing. After about 10 to 20 minutes, the ultraviolet spectrum exhibits no further change apparently due to complete conversion to the more stable of the two tautomers. A freshly prepared solution exhibits maxima in the ultraviolet region at 264 m$\mu$, 325 m$\mu$, 430 m$\mu$, and 450 m$\mu$, with log $\epsilon$ values of 4.64, 4.51, 4.43, and 4.37 respectively. Within approximately 20 minutes a constant ultraviolet spectrum is obtained which exhibits maxima at 265 m$\mu$, 323 m$\mu$, and 430 m$\mu$ with log $\epsilon$ values of 4.70, 4.63, and 3.79, respectively. Its infrared spectrum (KBr pellet) exhibits absorption maxima at 1563, 1471, 1429, 1269, 1202, 1177, 1087, 1047, 1020, 993, 948, 864, 844, 812, 772, 749 and 707 reciprocal centimeters.

12a-deoxytetracycline is readily soluble in pyridine and dimethylformamide; soluble in tetrahydrofuran to the extent of about 700 mg./100 ml., in boiling methanol to about 100 mg./100 ml. and only slightly soluble in nitromethane. It is soluble in acetic acid up to about 2 g./100 ml. without rapid C-4 epimerization occurring.

It can be identified by its ultraviolet spectrum and by paper chromatography. The $R_f$ value using MacIlvaine's buffer, pH 3.5 (phosphate/citrate) as immobile phase and nitromethane : chloroform : pyridine : n - butanol (20:10:5:3) as mobile phase is 0.7–0.75.

12a-deoxytetracycline demonstrates bioactivity against *Klebsiella pneumoniae* and other organisms as mentioned below. It may be bioassayed by the standard turbidimetric procedure using *Klebsiella pneumoniae* as test organism.

As indicated above, the products of the present invention possess appreciable biological activity against a variety of pathogenic organisms. The following table lists the antibacterial activity of 12a-deoxytetracycline. The tests were conducted under standard conditions. Minimum inhibitory concentrations (MIC) in terms of mcg./ml. are reported.

TABLE I

| Organism: | 12a-deoxytetracycline |
|---|---|
| *Micrococcus pyogenes* var. *aureus* | 3 |
| *Streptococcus pyogenes* | 3 |
| *Streptococcus faecalis* | 3 |
| *Diplococcus pneumoniae* | 6.3 |
| *Erysipelothrix rhusiopathiae* | 3 |
| *Corynebacterium diphtheriae* | 12.5 |
| *Listeria monocytogenes* | 12.5 |
| *Bacillus subtilis* | 3 |
| *Lactobacillus casei* | 100 |
| *Bacterium ammoniagenes* | 6.3 |
| *Aerobacter aerogenes* | 12.5 |
| *Escherichia coli* | 12.5 |
| *Proteus vulgaris* | 100 |
| *Pseudomonas aeruginosa* | 100 |
| *Salmonella typhosa* | 12.5 |
| *Salmonella pullorum* | 6.3 |
| *Micrococcus pyogenes* var. *aureus* (antibiotic resistant strains): | |
| #376 | 100 |
| #400 | 50 |
| *Phytomonas phaseolicola* | 12.5 |
| *Xanthomonas vesicatoria* | 3 |
| *Klebsiella pneumoniae* | 25 |
| *Neisseria gonorrhoeae* | 6.3 |
| *Hemophilus influenzae* | 3 |
| *Shigella sonnei* | 12.5 |
| *Brucella bronchiseptica* | 6.3 |
| *Pasteurella multocida* | 3 |
| *Mycobacterium 607* | 1.56 |
| *Mycobacterium berolinense* | 0.39 |
| *Candida albicans* | 100 |
| *Streptococcus agalactiae* | 6.3 |

The 5a,6-anhydro-12a-deoxy compounds of this invention are readily prepared from a 12a-deoxytetracycline-type antibiotic having the formula:

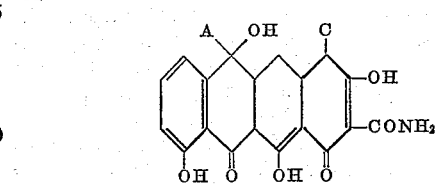

wherein A and C are as defined above by treatment with an acid dehydrating agent such a hydrochloric acid, hydrobromic acid, sulfuric acid, phosphoric acid, toluene sulfonic acid, benzene sulfonic acid in a reaction-inert organic solvent at a temperature of from about 0° C. to about 50° C. until one molecule of water is removed. Suitable solvents for this dehydration are lower alcohols, acetone, 1,2-dimethoxyethane, glacial acetic acid, and dimethylformamide. The 5a,6-anhydro products are isolated, generally as the acid addition salts, by known methods, for example, by dilution of the reaction mixture with water, or by evaporation. The free base forms are obtained by neutralization.

The 5a,6-anhydro-12a-deoxy compounds are biologically active against a variety of gram-positive and gram-negative microorganisms generally to a somewhat lesser degree than are the parent tetracyclines. However, they are effective against certain tetracycline-resistant strains of bacteria and are, therefore, of considerable value.

The novel 12a-deoxy compounds of this invention may serve as intermediates for the preparation of a variety of derivatives of tetracycline-type antibiotics. They can, for example, be converted to acid addition salts by treatment with a mineral acid, such as, hydrochloric acid, sulfuric acid, phosphoric acid, or a strong organic acid, such as, paratoluenesulfonic acid. As already mentioned, the 12a-deoxy-compounds of this invention which contain a C-6 hydroxyl are easily converted to the corresponding 5a-6-anhydro-derivatives on treatment with mineral acids. Therefore, because of this sensitivity to mineral acids, care must be exercised in preparing the acid addition salts of such 12a-deoxytetracyclines. The hydrochloride salt of 12a-deoxytetracycline, for example, is prepared by treating 12a-deoxytetracycline with hydrogen chloride in a 1:1 molar ratio. The use of an excess of hydrogen chloride results in dehydration at the 5a,-6-positions with formation of 5a,6-anhydro-12a-deoxytetracycline as discussed above.

Various substituents may be introduced at the 12a-position of the 12a-deoxy compounds. For example, reaction of 4-desdimethylamino-12a-deoxy-5-hydroxytetracycline with methyl iodide in the presence of potassium carbonate introduces a methyl group at the 12a-position. Bromination yields a product believed to contain a bromine atom in the 12a-position. Reaction with perbenzoic acid may introduce an hydroxyl group at the 12a-carbon atom. In certain cases, the newly introduced groups possess the reverse stereochemistry of the 12a-hydroxyl group of the parent compound. 12a-deoxy tetracycline undergoes reaction with a variety of reagents, often in a unique and unexpected manner. 12a-deoxytetracycline, for example, reacts with perbenzoic acid or peracetic acid in solvents, such as, chloroform, tetrahydrofuran, dimethylformamide, with production of a product having an ultraviolet spectrum identical to that of 4a,12a-anhydrotetracycline. Treatment of 12a-deoxytetracycline with bromine in water produces 5a,6-anhydro-12a-deoxytetracycline whereas treatment with bromine in buffered solution produces a product having an ultraviolet spectrum identical to that of 4a,12a-hydrotetracycline. Reaction with methyl iodide in the presence of potassium carbonate produces a compound which, on ultraviolet study, is found to possess the 4a,12a-anhydro chromophore group. Formaldehyde or tricholoromethylfluoride yields a product which exhibits an 8-hydroxytetralone type absorption in the ultraviolet.

Furthermore, the compounds of this invention can be reacted with formaldehyde and various primary and secondary amines, including aliphatic, aromatic and heterocyclic amines, to form Mannich type reaction products, or with various aldehydes and ketones to form biologically active adducts, in which carbonyl compound and antibiotic exist in a 1:1 molar ratio. The new compounds thus produced exhibit solubility characteristics which differ from those of the parent compounds. In addition 12a-deoxytetracyclines may serve as a basis for the synthesis of tetracycline and for the introduction of a halogen atom into the 12a-position.

The following examples are given by way of illustration and are not to be regarded as limitations of this invention, many variations of which are possible without departing from the spirit or the scope thereof.

*Example I*

12a-DEOXYTETRACYCLINE 15 g. of 12a-(O-formyl)-tetracycline, 200 ml. of tetrahydrofuran and 6 g. of 5% palladium on charcoal were placed into the reaction vessel of a Parr Hydrogenator. The reaction vessel was flushed with hydrogen, pressurized to 50 p.s.i. and then heated and agitated at 55° C. for 20 hours. The reaction vessel was cooled, the pressure released and the contents removed. The catalyst was filtered off and washed with 50 ml. tetrahydrofuran. An equal volume of methanol was added to the combined filtrate and washings and the resulting solution concentrated to one-third volume under reduced pressure at 30°–35° C.

The product which separated was removed by filtration, washed with methanol and dried. It was obtained as orange-red crystals containing one mole of methanol: M.P. about 250° C. (dec.).

*Analysis.*—Calcd. for $C_{22}H_{24}O_7N_2 \cdot CH_3OH$: 59.99% C; 6.13% H; 6.08% N; 6.73% methoxyl. Found: 60.19; C; 6.00% H; 5.87% N; 6.45% methoxyl.

Its infrared spectrum (KBr pellet) exhibits absorption maxima at 1563, 1471, 1429, 1269, 1202, 1177, 1087, 1047, 1020, 993, 948, 864, 844, 812, 772, 749 and 707 reciprocal centimeters.

In the ultraviolet region, a freshly prepared solution exhibits the following λ max.: (log ε) values: 264 m$\mu$ (4.64), 325 m$\mu$ (4.51), 430 m$\mu$ (4.43), 4.50 m$\mu$ (4.37) which change relatively rapidly until, after about 20 minutes, the following constant values are obtained: 265 m$\mu$ (4.70), 323 m$\mu$ (4.63), 430 m$\mu$ (3.79).

Repetition of this procedure using dioxane, dimethylformamide, ethylether, Cellosolve acetate, ethylacetate and pyridine as solvent produces the same product.

*Example II*

Following the procedure of Example I, but using 0.5 g. palladium black as catalyst, 15 g. of the anhydrous amorphous form of 12a-(O-formyl) tetracycline was catalytically hydrogenolyzed in 250 ml. tetrahydrofuran to give a 44% yield of 12a-deoxytetracycline.

Using Whatman Paper No. 1 buffered to pH 3.5 with MacIlvaine's buffer, and chloroform:pyridine:nitromethane:n-butanol (10:3:20:5) as solvent system, $R_f$ values of 0.7–0.75 were obtained for 12a-deoxytetracycline.

When assayed by the *Klebsiella pneumoniae* procedure, 12a-deoxytetracycline exhibited activity corresponding to about 33 mcg. Substitution of 12a-(O-phenylcarbamyl)-tetracycline for 12a-(O-formyl)-tetracycline gave the same product. Similarly, the same product is obtained when these reactants are hydrogenolyzed at atmospheric pressure and 100° C. using platinum black or platinum oxide as catalyst.

*Example III*

Using the procedure of Example I, and the reaction conditions listed below, 12a-deoxytetracycline was obtained in yields ranging from 34–50%.

| T.° C | Pressure | Time (Hrs.) | Percent Yield |
|---|---|---|---|
| 55 | 40 | 23 | 44 |
| 55 | 50 | 10 | 34 |
| 85 | 40 | 12 | 37 |
| 55 | 120 | 10 | 40 |
| 100 | 40 | 8 | 34 |
| 55 | 100 | 23 | 50 |

Example IV

Following the procedure of the preceding examples, the $O^{12a}$-acyl derivatives of the tetracycline-type antibiotics listed below are converted to the corresponding 12a-deoxy derivatives.

| Reactant | Product |
|---|---|
| 12a-(O-monoformyl)-6-demethyltetracycline. | 6-demethyl-12a-deoxytetracycline. |
| 12a-(O-monoformyl)-6-demethyl-7-chlortetracycline. | Do. |
| 12a-(O-monoformyl)-6-deoxytetracycline. | 6,12a-dedeoxytetracycline. |
| 12a-(O-monoformyl)-6-deoxy-6-demethyltetracycline. | 6-demethyl-6,12a-dideoxytetracycline. |
| 12a-(O-phenylcarbamyl)-5-hydroxytetracycline. | 5-hydroxy-12a-deoxytetracycline. |
| 12a-(O-phenylcarbamyl)-6-deoxytetracycline. | 6,12a-dideoxytetracycline. |
| 12a-(O-phenylcarbamyl)-4-desdimethylamine-5-hydroxy-6-deoxytetracycline. | 4-desdimethylamino-5-hydroxy-6,12a-dideoxytetracycline. |
| 12a-(O-phenylcarbamyl)-7-bromotetracycline. | 12a-deoxytetracycline. |
| 12a-(O-phenylcarbamyl)-4-desdimethylamino-7-chlorotetracycline. | 4-desdimethylamino-12a-deoxytetracycline. |
| 12a-(O-phenylcarbamyl)-4-desdimethyl-amino-6-demethyl-tetracycline. | 4-desdimethylamino-6-demethyl-12a-deoxytetracycline. |
| 12a-(O-phenylcarbamyl)-4-desdimethyl-amino-6-deoxytetracycline. | 4-desdimethylamino-6,12a-dideoxytetracycline. |

Example V

12a-DEOXYTETRACYCLINE (FROM 12a-(O-FORMYL)-7-CHLORTETRACYCLINE)

Following the procedure of Example I, 2 g. of 12a-(O-formyl)-7-chlortetracycline was converted to 12a-deoxytetracycline. The product was identified by paper chromatography using chloroform:pyridine:nitromethane: n-butanol (10:3:20:5) as solvent system; Whatman paper No. 1 buffered at pH 3.5 with MacIlvaine's Buffer: $R_f = 0.7$.

Substitution of the 12a-(O-monoformyl)-derivative of 7-bromotetracycline for 12a-(O-monoformyl)-7-chlortetracycline produces 12a-deoxytetracycline.

Example VI

Following the procedures of the preceding examples, the following $O^{12a}$- substituted phenylcarbamyl derivatives of tetracycline, 7-chlortetracycline and 7-bromotetracycline are hydrogenolyzed to 12a-deoxytetracycline.

A. 12a-(O-(substituted phenylcarbamyl)-tetracycline:
  o-Chlorophenylcarbamyl
  o-Methoxyphenylcarbamyl
  p-Bromophenylcarbamyl
  p-Ethoxyphenylcarbamyl
  2-chloro-4-tolylcarbamyl
  p-Nitrophenylcarbamyl
  2,4-dichlorophenylcarbamyl
  2-nitro-4-tolylcarbamyl
  1-naphthylcarbamyl
  2,5-dichloro-1-naphthylcarbamyl B. 12a-(O-(substituted phenylcarbamyl)-7 - chlortetracyclines:
  m-Chlorophenylcarbamyl
  p-Nitrophenylcarbamyl
  o-Tolylcarbamyl
  p-Propoxyphenylcarbamyl
  p-Hexylphenylcarbamyl
  4-(o-xylyl)carbamyl
  1-naphthylcarbamyl
  2-naphthylcarbamyl
  2,5-dichlorophenylcarbamyl C. 12a-(O-(substituted phenylcarbamyl)-7-bromotetracyclines:
  p-Propylphenylcarbamyl
  2,5-dimethoxyphenylcarbamyl
  o-Nitrophenylcarbamyl
  p-Fluorophenylcarbamyl

Example VII

Additional 12a-deoxy derivatives of the tetracycline-type antibiotics are prepared from the following reactants by the procedures of Example III.

| Reactant | Product |
|---|---|
| 12a-(O-2,5-dichlorophenylcarbamyl)-5-hydroxy tetracycline. | 5-hydroxy-12a-deoxytetracycline. |
| 12a-(O-p-nitrophenylcarbamyl)-6-demethyltetracycline. | 6-demethyl-12a-deoxytetracycline. |
| 12a-(O-p-nitrophenylcarbamyl)-5-hydroxytetracycline. | 5-hydroxy-12a-deoxytetracycline. |
| 12a-(O-p-nitrophenylcarbamyl)-4-desdimethylaminotetracycline. | 4-desdimethylamino-12a-deoxytetracycline. |
| 12a-(O-p-nitrophenylcarbamyl)-4-desdimethyl-amino-7-chlortetracycline. | Do. |
| 12a-(O-p-fluorophenylcarbamyl)-6-deoxytetracycline. | 6,12a-dideoxytetracycline. |
| 12a - (O - 2,4 - dibromophenylcarbamyl) - 6 - deoxy - 6 - demethyltetracycline. | 6-demethyl-6,12a-dideoxytetracycline. |
| 12a - (O - o - tolylcarbamyl) - 5 - hydroxytetracycline. | 5-hydroxy-12a-deoxytetracycline. |
| 12a-(O-phenylcarbamyl)-4-desdimethylamino - 6 - demethyl - 7 - chlortetracycline. | 4-desdimethylamino-6-demethyl-12a-deoxytetracycline. |
| 12a-(O-p-propoxyphenylcarbamyl)-6-deoxytetracycline. | 6,12a-dideoxytetracycline. |
| 12a-(O-p-aminophenylcarbamyl)-6-demethyltetracycline. | 6-demethyl-12a-deoxytetracycline. |
| 12a-(O-p-iodophenylcarbamyl)-6-deoxy-5-hydroxytetracycline. | 5-hydroxy-6,12a-dideoxytetracycline. |
| 12a-(O-p-butylphenylcarbamyl)-6-deoxytetracycline. | 6,12a-dideoxytetracycline. |
| 12a-(O-4-(o-xylyl)carbamyl)-6-demethyl-7-chlortetracycline. | 6-demethyl-12a-deoxytetracycline. |
| 12a-(O-p-aminophenylcarbamyl)-4-desdimethylamino-tetracycline. | 4-desdimethylamino-12a-deoxytetracycline. |
| 12a-(O-p-aminophenylcarbamyl)-5-hydroxy-tetracycline. | 5-hydroxy-12a-deoxytetracycline. |
| 12a-(O-p-aminophenylcarbamyl)-4-desdimethylamino - 5 - hydroxy-tetracycline. | 4-desdimethylamino - 5-hydroxy-12a-deoxytetracycline. |
| 12a-(O-1-naphthylcarbamyl)-5-hydroxy-tetracycline. | 5-hydroxy-12a-deoxytetracycline. |
| 12a-(O-3,4-dimethyl-1-naphthylcarbamyl) - 6 - demethyltetracycline. | 6-demethyl-12a-deoxytetracycline. |
| 12a-(O-8-nitro-1-naphthylcarbamyl)-4-desdimethylaminotetracycline. | 4-desdimethylamino-12a-deoxytetracycline. |
| 12a-(O-2-naphthylcarbamyl)-5-hydroxytetracycline. | 5-hydroxy-12a-deoxytetracycline. |

Example VIII

To 10.6 gms. of 12,12a-(O-diacetyl)-4-epitetracycline in 250 ml. of tetrahydrofuran contained in a Parr Hydrogenator was added 10.6 gms. of 5% palladium on charcoal. The reaction vessel was charged with hydrogen to 50 p.s.i. and heated to 55° C. for about 10 hours. The reaction mixture was cooled, filtered and evaporated to dryness under pressure. The residue, 12a-(O-monoacetyl)-4-epi-12a-deoxytetracycline was then hydrolyzed by dissolving in a 1:10 water-ammonia solution. The ammonium salt of 4-epi-12a-deoxytetracycline was obtained on evaporating the solution at room temperature in vacuo.

Neutralization of the ammonium salt with a dilute mineral acid produces the 4-epi-12a-deoxytetracycline.

In like manner, the following 10,12a-(O-diacyl)-derivatives of 5-hydroxytetracycline are converted to the 12a-deoxy derivative of 5-hydroxy-tetracycline: the diacetyl-, the dipropionyl-, the dicaproyl and the divaleryl-derivatives.

Example IX

Following the procedure of Example I but using elevated pressures of 1000, 1500 and 2000 p.s.i., and a temperature of 50° C., 12a-(O-monoformyl) tetracycline was converted to 12a-deoxytetracycline.

Utilizing the same procedure plus, in the case of the diacyl reactants, the hydrolysis procedure of Example VIII, the following 12a-(O-acyl) compounds converted to their respective 12a-deoxy derivatives:

12a-(O-monoacetyl)-5-hydroxytetracycline
12,12a-(O-diacetyl)-tetracycline
10,12a-(O-dipropionyl)-5-hydroxytetracycline
5,12a-(O-diacetyl)-5-hydroxytetracycline 12a-(O-monoacetyl)-tetracycline
12a-(O-monobutyryl)-tetracycline
12a-(O-monocaproyl)-tetracycline
12a-(O-monopropionyl)-7-bromotetracycline
12a-(O-monoacetyl)-7-chlortetracycline
12a-(O-monovaleryl)-tetracycline
12a-(O-monopropionyl)-5-hydroxytetracycline
diformyl-5-hydroxytetracycline

Example X

5a,6-ANHYDRO-12a-DEOXYTETRACYCLINE HYDROCHLORIDE

A solution of 1.0 g. 12a-deoxytetracycline in 2 molar methanolic hydrochloric acid was heated to boiling for 15 minutes. The yellow crystalline precipitate which separated was recrystallized from dioxane-methanol to yield 5a,6-anhydro-12a - deoxytetracycline hydrochloride. When assayed by the standard *Klebsiella pneumoniae* procedure it exhibited activity corresponding to about 23 mcg./mg.

In a similar manner, the following 5a,6-anhydro-12a-deoxy compounds are prepared (substituting 6 molar hydrochloric acid-n-propanol as the dehydrating reagent in the case of the 6-demethyl compounds):

5a,6-anhydro-6-demethyl-12a-deoxytetracycline
4-desdimethylamino-5a,6-anhydro-12a-deoxytetracycline
4-desdimethylamino-5a,6-anhydro - 6 - demethyl-12a-deoxytetracycline

Example XI

12a-DEOXYTETRACYCLINE HYDROCHLORIDE 1.0 g. of 12a-deoxytetracycline was dissolved in methanol containing an equimolar amount of hydrogen chloride. The salt was precipitated with ether and recrystalized from ethylacetatemethanol as yellow crysatls.

In like manner, the hydrochloride salts of the 12a-deoxy products of Examples IV, VI, VIII and X are prepared, in the cases in which an amino group is present.

Substitution of sulfuric acid or phosphoric acid for hydrochloric acid produces the corresponding sulfate and phosphate salts.

What is claimed is:

1. The process which comprises treating a compound selected from the group consisting of 12a-(O-monoformyl)-tetracycline, 12a-(O-monoformyl)-7-chlortetracycline, 12a-(O-monoformyl)-7-bromo-tetracycline, 12a-(O-monoformyl)-6-demethyltetracycline, 12a-(O-monoformyl)-6-deoxytetracycline, 12a-(O-monoformyl)-6-deoxy-6-demethyltetracycline, 12a-(O-monoformyl)-6-demethyl-7-chlortetracycline, 12a-(O-acyl)-tetracycline, 12a-(O-acyl)-7-chlortetracycline, 12a-(O-acyl)-5-hydroxytetracycline, wherein the acyl radical is of the formula

and R' is alkyl of from 1 to 5 carbon atoms; and a 12a-(O-arylcarbamyl)-derivative of a tetracycline-type antibiotic selected from the group consisting of:

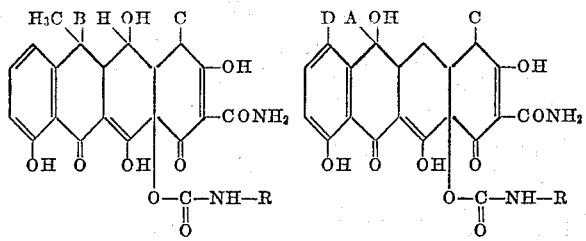

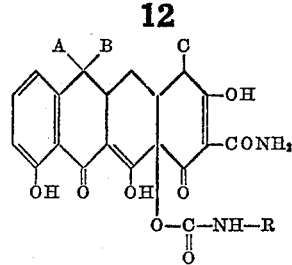

wherein A is selected from the group consisting of hydrogen and methyl; B is selected from the group consisting of hydrogen and hydroxyl; C is selected from the group consisting of hydrogen and dimethylamino; D is selected from the group consisting of chloro and bromo: R is selected from the group consisting of:

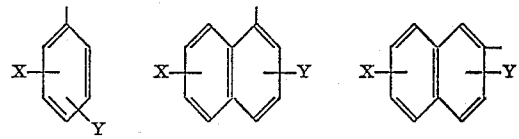

wherein X and Y are selected from the group consisting of hydrogen, halogen, lower alkyl, lower alkoxy, nitro and amino, with hydrogen in the presence of a hydrogenolysis catalyst selected from the group consisting of palladium, platinum black, and platinum oxide in a substantially anhydrous reaction-inert solvent at a temperature of from about 45° C. to about 100° C. and a pressure of from about atmospheric to about 2000 p.s.i. and recovering resulting 12a-deoxytetracycline compound.

2. The process which comprises treating a compound selected from the group consisting of 10,12a-(O-diacyl)-5-hydroxytetracycline, 12,12a-(O-diacyl) - tetracycline, 12,12a - (O-diacyl)-4-epi-tetracycline, and 5,12a-(O-diacyl)-5-hydroxytetracycline wherein the acyl radical is of the formula

and R' is alkyl of from 1 to 5 carbon atoms; and diformyl-5-hydroxytetracycline with hydrogen in the presence of a hydrogenolysis catalyst selected from the group consisting of palladium, platinum black, and platinum oxide in a substantially anhydrous reaction-inert solvent at a temperature of from about atmospheric to about 2000 p.s.i. and recovering resulting 12a-deoxytetracycline compound.

3. The process which comprises reacting a compound selected from the group consisting of 10-(O-monoacyl)-5-hydroxy-12a-deoxytetracycline, 12-(O-monoacyl)-12a-deoxytetracycline, 12-(O-monoacyl-4-epi-12a-deoxytetracycline and 5-(O-monoacyl)-5-hydroxy-12a-deoxytetracycline, wherein the acyl radical is of the formula

wherein R' is alkyl of from 1 to 5 carbon atoms; and (monoformyl)-5-hydroxy - 12a - deoxytetracycline with aqueous ammonia and subsequently recovering resulting 12a-deoxy compound therefrom.

References Cited in the file of this patent

UNITED STATES PATENTS 2,731,497    McCormick et al. _____ Jan. 17, 1956

FOREIGN PATENTS 167,750    Australia _____ May 25, 1956

OTHER REFERENCES

Pasternack et al.: J.A.C.S., vol. 74, pp. 1926–8 (1952).
Stephens et al.: J.A.C.S., vol. 76, pp. 3568–70 (1954).

UNITED STATES PATENT OFFICE
CERTIFICATE OF CORRECTION

Patent No. 3,002,021                          September 26, 1961

Hans H. Rennhard et al.

It is hereby certified that error appears in the above numbered patent requiring correction and that the said Letters Patent should read as corrected below.

Column 1, lines 42 to 49, the formula should appear as shown below instead of as in the patent:

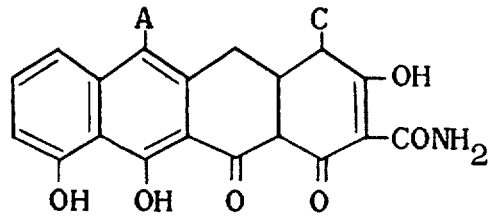

column 8, line 25, for "250° C." read -- 230° C. --; column 9, in the table of Example IV, column 1, line 14 thereof, for "methylamine-5-" read -- methylamino-5- --; same column 9, same table, column 2, line 3 thereof, for "6,12a-dedeoxytetracycline" read -- 6,12a-dideoxytetracycline --; column 11, line 36, for " crysatls" read -- crystals --.

Signed and sealed this 3rd day of April 1962.

(SEAL)
Attest:

ERNEST W. SWIDER                          DAVID L. LADD
Attesting Officer                       Commissioner of Patents